United States Patent [19]

Engel et al.

[11] Patent Number: 4,484,846
[45] Date of Patent: Nov. 27, 1984

[54] ACTUATION OF A CARGO RESTRAINER

[75] Inventors: Hinrich Engel, Bremen; Eckhard Koch, Lilienthal, both of Fed. Rep. of Germany

[73] Assignee: Vereinigte Flugtechnische Werke GmbH, Bremen, Fed. Rep. of Germany

[21] Appl. No.: 335,370

[22] Filed: Dec. 29, 1981

[30] Foreign Application Priority Data

Dec. 23, 1980 [DE] Fed. Rep. of Germany ....... 3048652

[51] Int. Cl.³ .................. B60P 7/08; B61D 45/00; B63B 25/22
[52] U.S. Cl. .................. 410/69; 244/137 R; 267/114; 410/77; 410/94
[58] Field of Search .................. 244/137 R, 137 L; 267/114; 410/69, 70, 78, 79, 91, 92, 94

[56] References Cited

U.S. PATENT DOCUMENTS

| | | | |
|---|---|---|---|
| 3,034,825 | 5/1962 | Harlander et al. | 410/69 |
| 3,709,450 | 1/1973 | Watts et al. | 410/92 X |
| 3,773,311 | 11/1973 | Poe et al. | 267/114 |
| 4,375,932 | 3/1983 | Alberti | 410/69 |

FOREIGN PATENT DOCUMENTS

| | | | |
|---|---|---|---|
| 998823 | 7/1965 | United Kingdom | 410/69 |
| 1413948 | 11/1975 | United Kingdom | 410/69 |
| 1481449 | 7/1977 | United Kingdom | 410/69 |

*Primary Examiner*—Howard Beltran
*Attorney, Agent, or Firm*—Ralf H. Siegemund

[57] ABSTRACT

A spring-biased restraining member is retracted by means of a remotely positioned, manually operable lever being outside the cargo space; the linkage includes a hydraulic structure for delayedly returning the lever and the restraining member to the protracted position. The linkage unlocks a latch and enables the cargo to overrun the restraining member even from that side that is to lock the cargo when the restraining member is in its locked position. In the other direction, the restraining member is overridden by the cargo out of each position of the restraining member structure between the lever and the restraining member.

8 Claims, 6 Drawing Figures

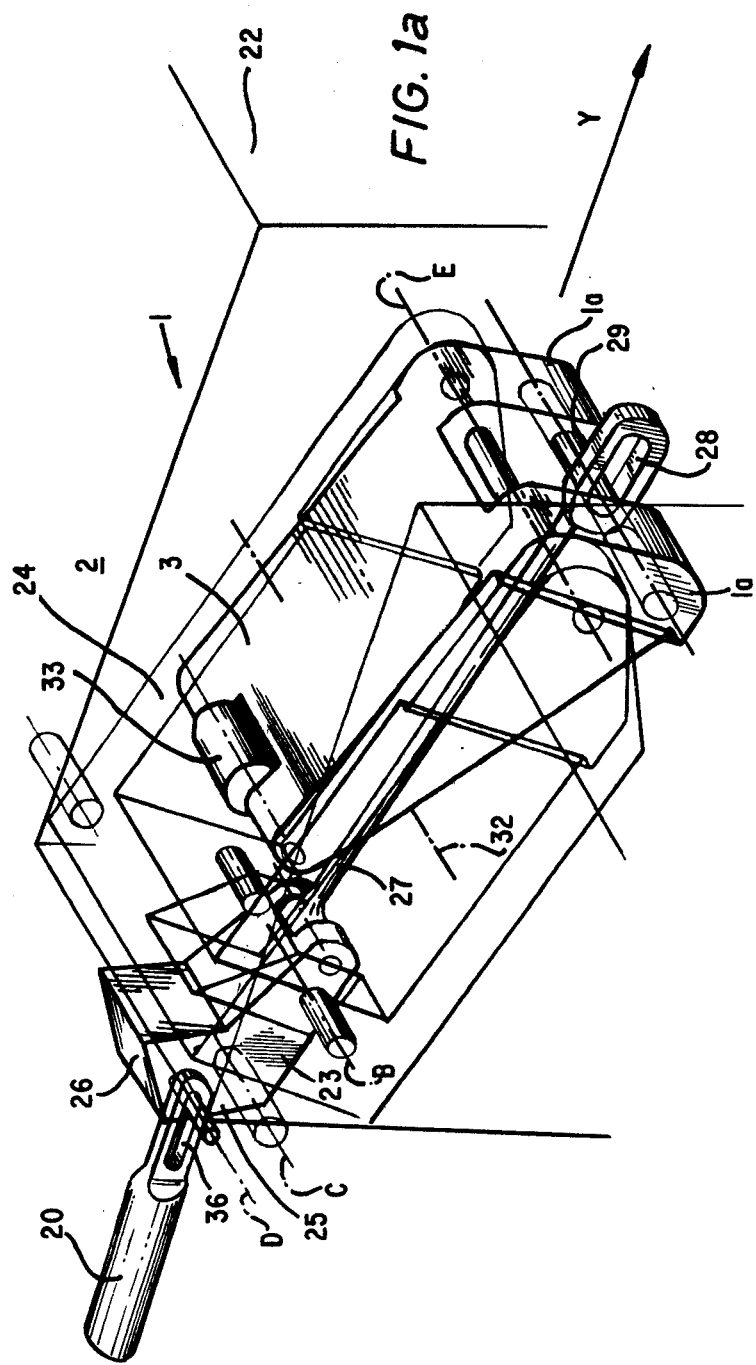

ACTUATION OF A CARGO RESTRAINER

BACKGROUND OF THE INVENTION

The present invention relates to the manual actuation of spring-loaded fold-down door restrainers in freight loading systems, particularly in the door latch area for freight and cargo space in an aircraft.

Generally speaking, containers and freight pallets must be securely held in the respective vehicle; or at least steps must be taken to prevent these objects from moving while the vehicle moves. In view of the rather high acceleration and deceleration forces that occur in an aircraft, the problem is, indeed, a significant one in this particular environment. On the other hand, speed is of the essence in handling and moving of air cargo; this includes, in particular, loading and unloading times. Thus, one needs cargo restraining devices that will hold, e.g., a container or a pallet firmly and securely but is easily retractable.

A retractable restraint is particularly required for restraining cargo near the door of the aircraft through which the cargo passes during loading and unloading. U.S. Pat. No. 3,709,450 discloses a system for on-board cargo and load handling in aircraft which includes manually operable, retractable cargo restrainers near doors. The device used here includes a lever in order to retract such a restrainer to a position below the floor and conveyor plane of load-moving and load-positioning. This means that pallets and containers, and so forth, can be rolled over the retracted restrainers during cargo-loading and unloading. The cargo pieces force the restrainer against the force of a spring into a position underneath the conveyor plane so that the cargo can pass through the door; but, thereafter, these restrainers are returned to the protracted position.

DESCRIPTION OF THE INVENTION

It is an object of the present invention to provide for manual actuation of the retraction of a restraining member in the floor structure of a cargo area, such as inside a vehicle, e.g., an aircraft.

It is a particular object of the present invention to provide for such manual retraction which is to function speedily for, particularly, permitting rapid unloading of cargo space.

It is a further object of the present invention to improve manually operated retraction of a restraining member near a cargo door in an aircraft, the restraining member to be effective as against forces acting in the direction corresponding to displacement of cargo in an unloading direction, but being retractable by any load engaging it in the opposite direction such as during loading of the cargo space. The manually operated retraction of the restraining member is to be simplified, made faster, and safe.

In accordance with the preferred embodiment of the present invention, it is suggested to provide a remotely pivoted lever for retracting such a springbiased restraining member which lever is linked to the restraining member, and the linkage includes a reset structure for delayedly returning the lever and the restraining member to the protracted position. The linkage acts upon the restraining member by unlocking a latch which, when locked, prevents the restraining member from being pushed down by a piece of cargo that moves in one direction; additionally, the linkage, when actuated by the lever, retracts the restraining member. When the lever is not actuated, the restraining member is unlocked and can still be folded down, but only when being engaged by a piece of cargo from the opposite direction (e.g., during loading).

It can, thus, be seen that the restraining member is normally in a protracted position of restraining. For loading a piece of cargo can just roll over it and fold the member out of the way. For unloading, a single manual action unlatches the restraining member and pulls it down against spring forces. Release of the manual operation as well as completed passage of a piece of cargo will set free spring forces and delayed by the special actuator unit, the restraining member will move into the protracted position. The delayed return action of the actuation and restraining member permits a delay between the actuation and the passage of a piece of cargo over the member.

The preferred embodiment of the invention, the objects and features of the invention, and further objects, features and advantages thereof, will be better understood from the following description taken in connection with the accompanying drawings.

DESCRIPTION OF THE DRAWINGS

FIG. 1a is a view similar to FIG. 1, but showing the restrainer in a retracted position;

Proceeding now to the detailed description of the drawings, FIG. 1 and FIG. 1a illustrates a portion of a floor structure 22 in a cargo area inside an aircraft, whereby particularly the upper surface of that floor is the loading and conveyor plane 2. The floor includes a plurality of restrainers such as member 1. These restrainers are particularly positioned near a cargo door of the aircraft in order to act as restrainers by upwardly traversing conveyor plane 2. The restraining action involves particularly the upwardly extending arm of the restraining member 1. The arm will stop any movement of pieces of the cargo in the direction Y which may represent a direction transverse to the longitudinal axis of the aircraft.

The door-near restrainers 1 are also called Y-latches; and during loading and unloading of the aircraft, individual pieces of cargo (containers, pallets, etc.) have to pass over them. Accordingly, the members 1 are constructed and mounted to permit retraction, including possibly fold-down, particularly when encountering a piece of cargo that moves in the direction opposite arrow Y. Thus, member 1 does not constitute an obstacle for such movement. Also, the member 1 is spring-loaded to be reerected automatically after that piece of cargo has completely passed, as will be described.

The member 1 will not fold down and retract when acted upon by a piece of freight or cargo in the direction of arrow Y. As to such a movement, the member does act as a positive stop. Thus, if a piece of cargo is to pass in the direction Y, member 1 must be retracted below plane 2 and remain retracted through application of external action, at least until the piece of cargo is on top of the member and holds it down by its weight.

Figure 1:
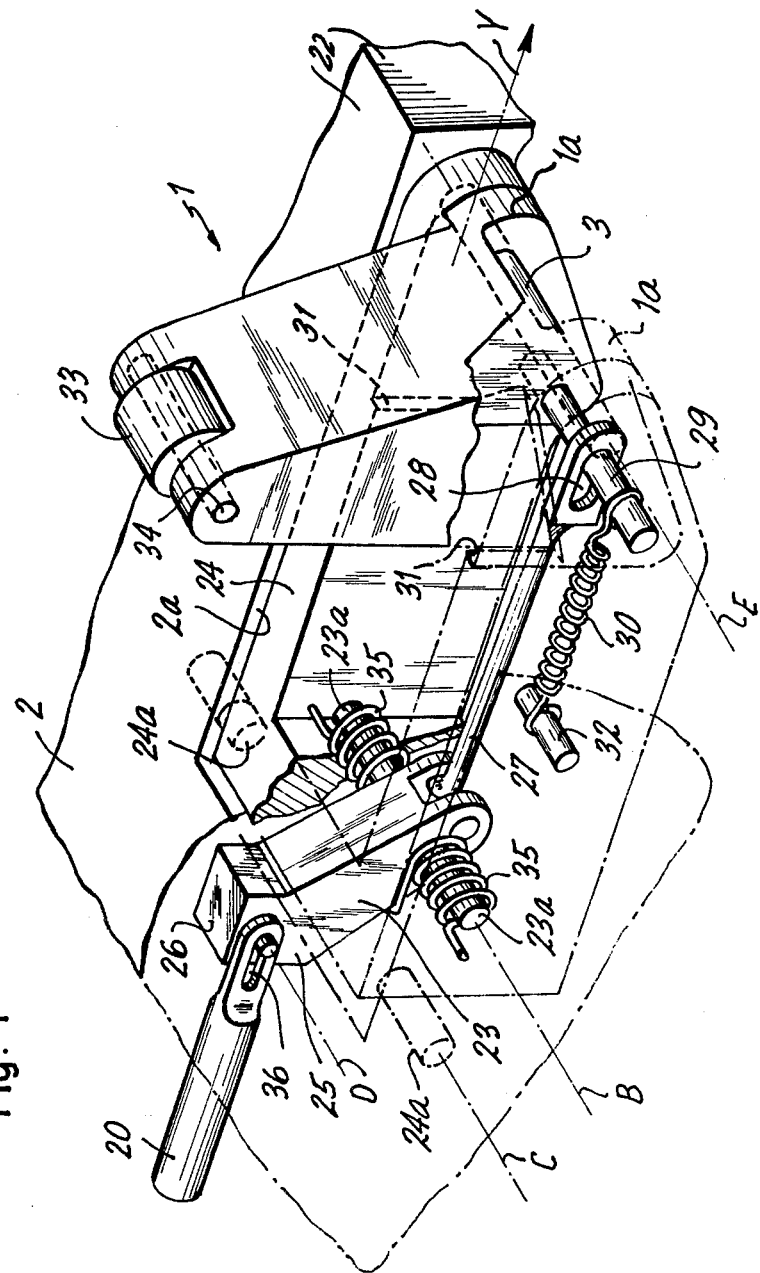
FIG. 1 illustrates a restrainer for an air cargo system constructed in accordance with the preferred embodiment of the present invention for practicing the best mode thereof, to be taken in conjunction with FIGS. 2 and 3 and showing the restrainer in an upright, restraining position.
Figure 2:
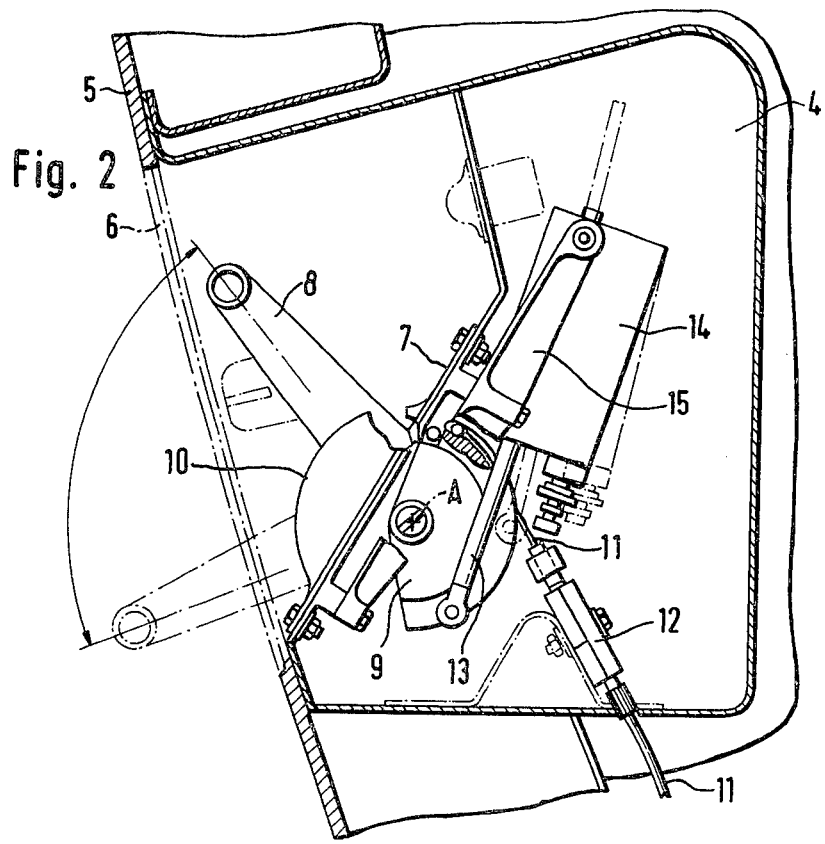
FIG. 2 is a cross section through a manual actuation portion for retracting such a restrainer.
Figure 3:
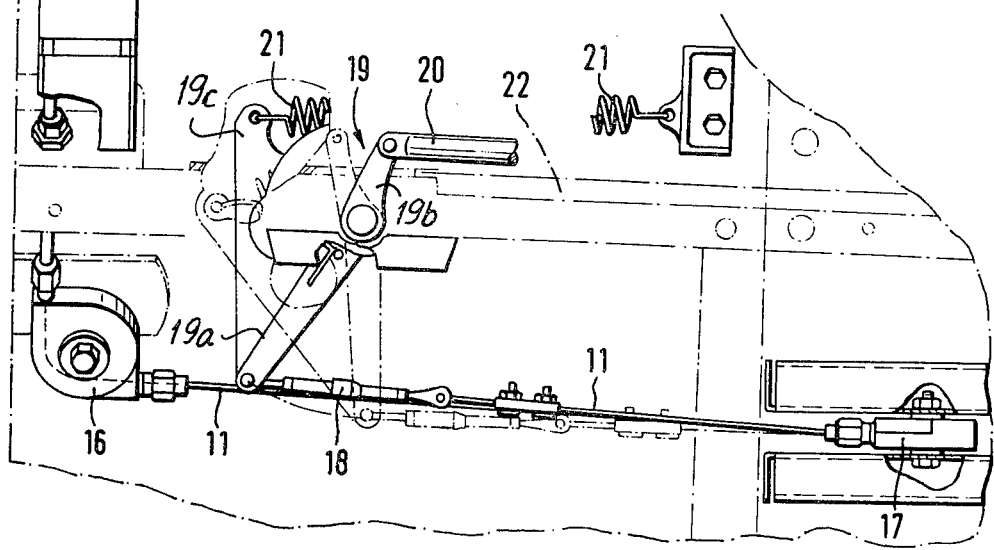
FIG. 3 is a somewhat schematic view illustrating the linkage between the actuator shown in FIG. 2 with the restraining member shown in FIG. 1.

Turning now to particulars of the inventive device, it can be roughly divided into an actuating portion which is depicted in FIG. 2, and a linking portion, which is depicted in FIG. 3. The structural combination will become apparent through certain parts which are depicted in respective two figures, such as cable 11 linking FIGS. 2 and 3 and rod 20 linking FIGS. 1 and 3. The portions of the system shown in FIGS. 2 and 3 are actually spatially separated in the aircraft because the manual actuator, depicted in FIG. 2, is located conveniently near the cargo space door in order to be accessable from the outside, and the structure shown in FIG. 3 links that actuator with the restraining members such as member 1 in FIG. 1.

The manual actuation portion shown in FIG. 2 is placed in an insert or pocket 4 in the outer skin 5 of the aircraft, e.g., next to the cargo space door and at a height making it readily accessable to personnel from the outsides. A flap 6, shown in phantom lines only, closes this pocket and ensures aerodynamical integrity of the outer contour of the fuselage of the aircraft. Flap or cover 6 is removed for purposes of actuation.

The pocket 4 contains a console-like portion 7 having an oblique panel, and an actuating lever 8 projects from that panel. The lever is provided for operating the linkage which in turn retracts the restraining member 1. Lever 8 is mounted for pivoting on an axis A which runs, approximately at least, parallel to the skin; the lever is pivotable over a range of approximately 70° and in downdirection. Its normal position is up, the lever is pulled down for retracting one or more restraining members.

Axis A pertains to a pin, and a circular disk segment 9 is mounted on that pin and secured to lever 8. The radius of segment 9 is about ⅓ the length of lever 8. A segment-shaped cover 10 projects outwardly from the panel of console 7 and receives segment 9 upon turning because the axis A is spaced from the panel at a distance less than the radius of segment 9.

The flexible cable 11 has one end attached to the segment 9 at a point near the periphery thereof. A guide structure 12 being fixed to pocket 4, runs the cable 11 in a particular direction, independently from the position of segment 9. That cable leads to the linkage structure of FIG. 3, and it is either pulled or released.

Still in FIG. 2, a piston rod 13 is povitally linked to segment 9, also at a point near the periphery thereof, but azimuthally displaced from the point of connection of the one end of cable 11. These points of connection have approximately similar distances from axis A. Piston rod 13 projects from a piston inside a hydraulic attenuating cylinder 14. A mounting piece 15 for the cylinder 14 connects the latter to the console 7 but in the back thereof. Moreover, the cylinder 14 is pivotally linked to the mounting piece or traverse 15.

Turning now to FIG. 3, the cable 11 runs from the console, etc., as per FIG. 3, to an encased deflection device 16 and towards another deflection device 17, actually being a reversing pulley structure. The cable ends in a connection to a tensioning, turnbuckle-like device 18. The tensioning turnbuckle 18 is connected to one end of a lever 19a pertaining to a lever linkage 19 which is, in effect, a twoarm lever. The other arm 19b of lever 19 is pivoted to the tension rod 20.

The lever linkage 19 includes another structure 19c, defining a third connect point which serves for the connection of one end of a spring 21 to lever 19. The rod 20, as will be discussed below, connects to several door restrainers 1 in series. The spring 21 serves as a return spring for the actuating and linking structure, but not for directly returning restraining member 1 to the upright position. The other end of spring 21 is secured to a suitable point of the fuselage, body frame, and/or floor structure 22 of the aircraft, of course, inside the cargo space thereof. The same is true for mounting the cable-redirecting structures and devices 16 and 17.

Returning now to FIG. 1, it shows the other end of the actuator rod 20; and it is presumed that the particular member 1 is the last one in a series of such restraining members, all being analogously linked to that rod. Normally, one will operatively connect two or three of such restrainers, and there are suitable rods linked to the rod 20 for that purpose.

Rod 20 is shown to have an oblong eye 36 receiving a pin which projects from a nose 25 of a two-arm pivot lever 23 acting as a latch. The pin axis is denoted by character D. This lever is mounted by pins 23a in a fork-like arm 24 which, in turn, is received in an opening 2a of the floor structure 22 and is mounted by pins 24a on that floor structure. Pins 23a establish a pivot axis B for lever 23, and pins 24a establish a pivot axis C for arm 24. It should be appreciated that pins 23a are laterally offset as well as below pins 24a.

The nose 25 of lever 23 is provided with an abutment surface 26, and the lever through the surface 26, can rest against an underside surface portion of floor structure 22, underneath conveyor plane 2. It is this abutment action which causes lever 23 to function as a lock or latch. As long as the fork member 24 is not pushed down, latch 23 engages floor structure 22 for latching to be described more fully below.

The "prongs" of fork arm 24 support the restraining member 1, and the space between the "prongs" of the fork is provided to receive member 1 when folded down for retraction.

The other arm of lever 23 is of forked construction, and one end of a rod 27 is pivotally received by this short arm fork. The other end of rod 27 is provided with an oblong eye 28 receiving a pin 29. The restraining member 1 has two downward oriented extensions 1a, and the pin 29 extends between these extensions. The member 1 itself is provided in the ends of the prongs of arm 24 under utilization of a pivot pin 3 for (a) defining the pivot axis E, and (b) being laterally offset from pin 29.

The pin 29 is connected to one end of a tension spring 30 whose other end is connected to a pin 32 which, in turn, is connected to arm 24. Spring 30 normally tends to pull restraining member 1 into a position of abutment against stop surface edges 31 (only one being visible) in the prongs of arm 24. In this disposition, restraining member 1 extends at approximately right angles to the conveyor plane 2. A pair of coil springs 35 surrounds the journal pins 23a and is ultimately responsible for holding member 1 in the illustrated position. The coil spring 35 tends to turn the latch lever 23 clockwise into the latching position. Accordingly, rod 27 is pulled to the rear-left in FIG. 1 which tends to turn member 1 clockwise (about pin 3), but stops 31 hold member 1 in the protracted upright position. Springs 35 provide for the spring bias of this position of member 1.

The upper end of restraining member 1 is provided with a recess receiving and journalling a roller 33 under utilization of an axle 34. The roller projects slightly beyond member 1 proper.

The structure as described functions and operates as follows. Actuation of retraction member 1 is not necessary when a piece of cargo moves in the direction opposite arrow Y and comes, so to speak, from the right-front in FIG. 1 for movement toward the left-rear. As that piece of cargo abuts the visible front surface of member 1, it causes to pivot the member 1 counterclockwise (as per FIG. 1).

Pin 29 follows the counterclockwise displacement about axis E, thereby carrying along rod 27 which moves toward the right front and pivots lever 23 counterclockwise about axis B. This way, nose 25 (surface 26) is unlocked from its position of engagement with the floor structure 22. Rod 20 is slightly displaced, but predominantly pivotally due to the oblong slot 36. This action has no effect upon linkage 19 (FIG. 3), but coil springs 35 are twisted further.

The weight of the piece of cargo permits the restraining member 1 to be folded down completely until no portion thereof projects beyond conveyor plane 2 (FIG. 1a). Moreover, due to the unlatching of lever 23 fork arm 24 can pivot about axis C (clockwise in FIG. 1) so that member 1 does not merely fold between the fork prongs of arm 24; but the end of the latter retracts also deeper into opening 2a. Pivot action of member 1 in fork 24 is carried out also against the force of spring 30. The roll 33 may project slightly into the plane 2 in order to rollingly engage the bottom of the passing piece of cargo.

As soon as the piece of cargo has passed, springs 30 and 35 pull member 1 up, in clockwise fashion, and lever 23 likewise pivots clockwise while fork 24 pivots up, i.e., counterclockwise, in order to restore the restraining, upright position of member 1. Upon engagement of surface 26 and the underside of floor structure 22, this position is, in effect, locked as far as any force acting upon member 1 in the direction of arrow Y is concerned, and for the following reasons.

If a piece of cargo acts upon member 1 in the Y-direction, not necessarily strictly in that direction but in a direction that includes a component in the Y-direction, then member 1 is forced against stop surface 31, tending to clockwise pivot fork 24 about axis C. This pivot action of fork 24, however, is prevented by latching lever 23 whose end surface 26 bears upon the fuselage's floor structure 22 and, thus, provides the requisite countertorque and reaction force that prevents such pivot action of lever 24 (please note that axis B tends to move down in FIG. 1; but due to the lateral offset, surface 26 not tends to move up, and that action is prevented).

Figure 3A:
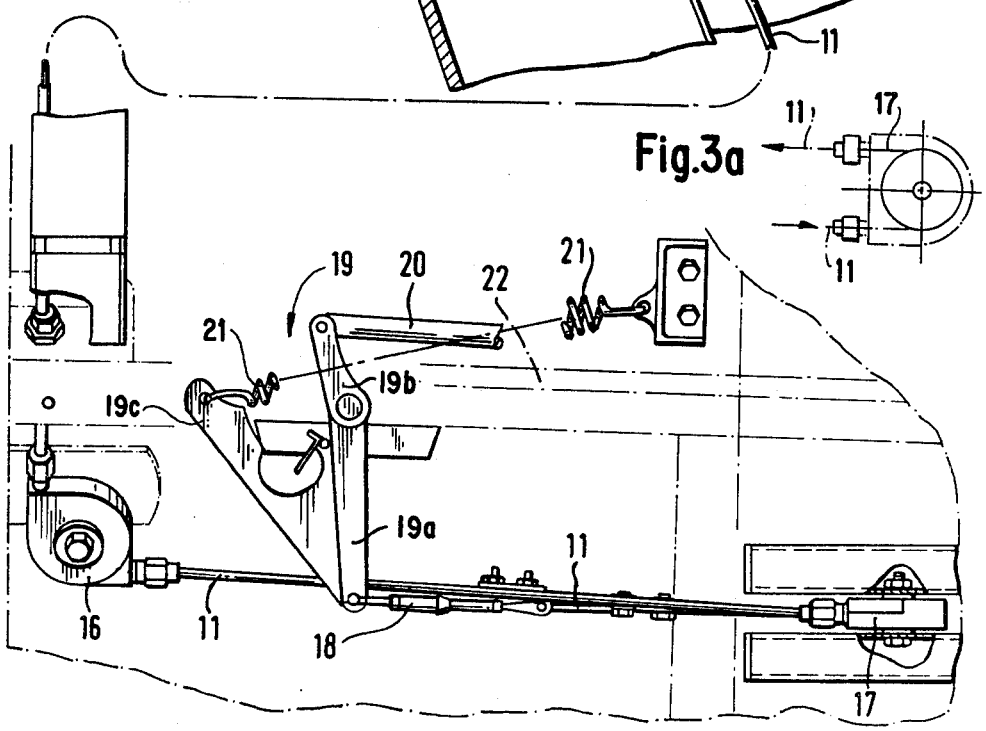
FIG. 3a shows a detail FIG. 3.

A piece of cargo can pass the restraining member in the Y-direction only after the member 1 has been retracted by manual actuation, to be described next. For this, we turn briefly to FIGS. 2 and 4. An operator will pivot lever handle 8 from the solidly drawn position into the dash-dot position, fully in FIG. 4. Since segment 9 follows that counterclockwise turning motion, cable 11 is being pulled. Upon pulling cable 11 (as redirected by devices 16 and 17—FIGS. 3 and 3a), lever arm 19a is pulled and pivoted into the dash-dot position, shown fully drawn in FIG. 4 so is the other arm, 19b, and rod 20 is pulled to the left (FIG. 4), which is toward the left-rear in FIGS. 1 and 1a. Accordingly, each lever 23 is pivoted counterclockwise about axis B, i.e., it unlatches. Moreover, as rod 20 pulls on lever 23, pivot pins 23a actually function as actuator pins and cause fork 24 to pivot about axis C so that the member 1 is rectracted by being lowered by the down-pivoting of fork 24. Member 1 is not folded in between the prongs of fork 24 in this case. The member 1 recedes until roller 33 is placed in the conveyor plane 2.

Figure 4:
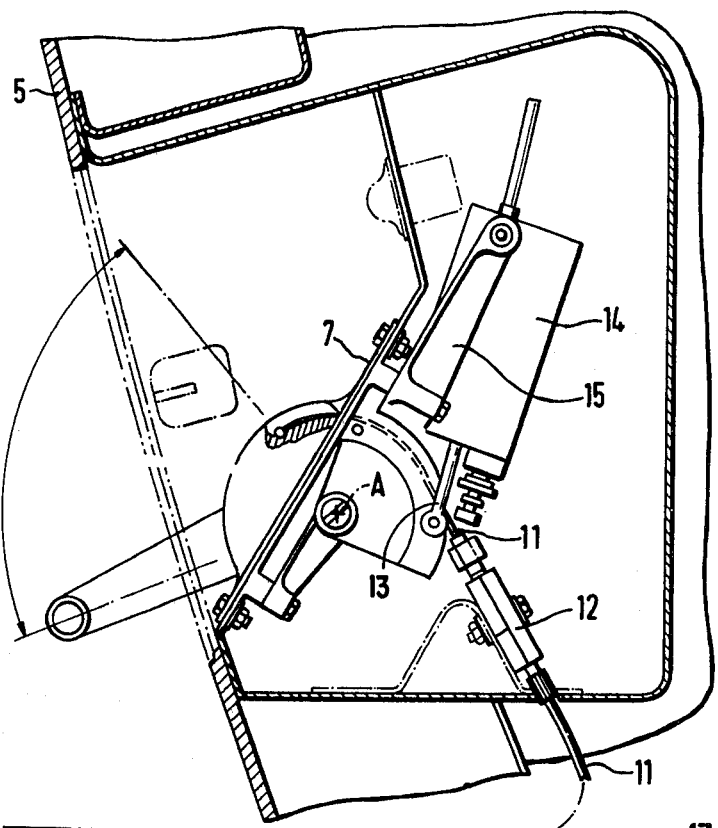
FIG. 4 is a combination of FIGS. 2 and 3 showing the linkage in a position following manual actuation.

Returning to the upper part of FIG. 4, pivoting of handle lever 8 has caused the piston 13 to be pushed into the cylinder 14, and its other end will now project from the other end of the cylinder as shown in dash-dot lines. This cylinder-piston arrangement acts as a delay for the restoration of the extended position of member 1. The attenuating cylinder 14 is constructed to exhibit the delay feature only for the extension of rod 13. In other words, there is no delay or undue force to be exerted on the handle lever 8 for pivoting it counterclockwise and pushing rod 13 up. FIG. 2 shows also that the cylinder 14 is slightly pivoted on its link to traverse 15.

Turning back to FIG. 3, and to the lower part of FIG. 4, the counterclockwise motion of lever 19 pursuant to pulling the cable 11 causes also spring 21 to be tensioned. Upon release of handle 8, spring 21 tends to pivot lever 19 clockwise which, in turn, tends to pull cable 11 in the direction opposite the pulling on actuator or handle lever 8. However, the spring tension is counteracted by piston/cylinder 14. Thus, upon release of handle 8 by the operator, cylinder 14 prevents any immediate pulling of cable 11 by the spring 21. Rather, the cable's return results from the changing balance as between hydraulic attenuation and spring force. Accordingly, the return of member 1 to the protracted position is delayed, but ultimately spring 21 pulls rod 20 back, and the cable 11 pulls the actuating structure back to the initial position. The movement of the rod 20 to the right from the position shown in FIG. 4 to the position shown in FIG. 3 tends to restore the latch position of lever 23 and returns member 1 to the restraining position.

Independent from the foregoing, member 1 and fork 24 remain pushed down by a passing piece of cargo (FIG. 1a). Moreover the (human) actuator does not have to critically observe the situation. Rather, he can simply pull lever 8 down and release it. The lever will not immediately return to the up position; i.e., member 1 will reerect delayed after lever release by operation of the hydraulic piston 13 and cylinder 14. Thus, a certain delay, such as 10 seconds, is established. After that delay, cargo cannot roll over member 1 because the latter is no longer retracted. On the other hand, even when the spring 21 begins to tend to restore the protracted position of member 1 as described, that member remains down as long as freight is on top. The slot 36 in rod 20 functions as a releasable coupling. Moreover, the oblong configuration of that slot causes a return of the rod 20, the lever 8, and so forth, even if the piece of freight still pushes member 1 down. In fact, structures 8-11-20 are temporarily decoupled from member 1 until member 1 is released by the piece of cargo, whereupon springs 35 and 30 cause the member 1 to snap back up, and lever 23 returns to the latching position.

The effective delay produced by the hydraulic may, for instance, be approximately 10 seconds. The inventive structure establishes noncriticality of the operation. Even if the delayed return of member 1 to the protracted disposition has already begun before the piece of freight has moved on top and roll 33 projects already a little above plane 2, the piece of freight will readily push it down again, because members 1 and 24 are not latched at that point by lever 23.

The invention is not limited to the embodiments described above; but all changes and modifications thereof, not constituting departures from the spirit and scope of the invention, are intended to be included.

We claim:

1. An actuating device for a restraining member in the floor structure of aircraft load systems, the restraining member having a retracted position and a protracted position to provide a restraining action in one direction, the member permitting fold-down by load, when engaged in a direction opposite the restraining direction, comprising:
    a manually operable lever;
    means for mechanically linking the lever to the member for causing its retraction underneath a conveyor plane defined by the floor structure;
    spring means connected to the means for linking and being biased upon actuation of said manually operable lever for causing the means for linking and the manually operable lever to return, following release of the manually operable lever and corresponding to the protracted position of said restraining member to which it is being returned;
    attenuating means for delaying the returning action by said spring and following release of the manually operable lever so that said member returns delayedly to the protracted position following said release; and
    latch means for locking the member in the protracted position, the latch means being connected to the means for linking to be released upon actuation of the lever, the latch means unlocking when the member is engaged by a load in the direction opposite the restraining direction.

2. A device as in claim 1, said latch means being additionally releasable upon pushing said member down in a particular direction, the member being locked by the latch means as against forces acting upon the member in opposite direction.

3. An actuating device for a restraining member in the floor structure of a cargo area of an aircraft, there being an aperture in the floor structure, the restraining member having a retracted position and a protracted position to provide a restraining action in one direction, the member permitting fold-down by load when engaged in a direction opposite the restraining direction, comprising:
    a fork-like lever pivotally mounted in the aperture, the restraining member being pivotally mounted in between prongs of the fork;
    a latch pivoted in the fork-like lever for preventing pivoting of the lever;
    means mechanically linking the latch to the member for overriding latching when the member is engaged by a load from one side in said opposite direction;
    a manually operable lever;
    means for linking the manually operable lever to the latch in order to obtain unlatching followed by pivoting the fork-like lever;
    means for operably linking the fork-like lever to the restraining member to obtain retraction of the restraining member as the fork-like lever is pivoted;
    spring means connected to the means for linking and being biased upon actuation of said manually operable lever for causing the means for linking and the manually operable lever to return following release of the manually operable lever and corresponding to the protracted position of said restraining member to which it is being returned; and
    attenuating means for delaying the returning action by said spring following release of said lever so that said member returns delayedly to the protracted position following said release.

4. An actuating device as in claim 3, the latch being constructed as a two-arm lever, the linking means including a first rod pivoted to one arm of the two-arm lever, the means for operable linking including a second rod pivoted to a second arm of the two-arm lever and to the member.

5. An actuating device as in claim 1 or 3, the attenuating means being a hydraulic cylinder-piston arrangement.

6. An actuating device as in claim 5, said manually operable lever being mounted for pivoting, the piston acting directly upon the manually operable lever.

7. An actuating device as in claim 6, said manually operable lever extending from a segment, the piston being pivotably linked to the segment.

8. An actuating device for a restraining member in a floor structure of a cargo area, the floor structure defining a conveyor plane, comprising:
    a manually pivotable lever;
    unidirectionally effective, attenuating means coupled to the lever and being loaded upon actuation of the lever, for a delayed return of the lever upon release thereof;
    linkage means including cable means connected to the lever and rod means moved in one direction by the cable means upon actuation of the lever;
    spring means coupled to the linkage means and being loaded upon said actuation, to move the rod means in the opposite direction and causing the lever to return upon release, said attenuating means delaying said return; and
    said rod means being linked to said restraining member, causing said member to be retracted upon being moved in the one direction, and causing the member to be protracted upon being moved by the spring means in the opposite direction.

* * * * *